(12) United States Patent
Kim et al.

(10) Patent No.: US 7,508,962 B2
(45) Date of Patent: Mar. 24, 2009

(54) LIQUID CRYSTAL DISPLAY DEVICE PERFORMING BOTH IMAGE DISPLAY MODE AND FINGERPRINT RECOGNITION MODE

(75) Inventors: Choong Hoo Kim, Seoul (KR); Kyu Chang Park, Seoul (KR); Min Soo Shim, Seoul (KR)

(73) Assignee: Hydis Technologies Co., Ltd., Gyeonggi-do (KR)

( * ) Notice: Subject to any disclaimer, the term of this patent is extended or adjusted under 35 U.S.C. 154(b) by 631 days.

(21) Appl. No.: 10/331,523

(22) Filed: Dec. 30, 2002

(65) Prior Publication Data

US 2003/0174256 A1    Sep. 18, 2003

(30) Foreign Application Priority Data

Mar. 12, 2002    (KR) ...................... 10-2002-0013197

(51) Int. Cl.
| | |
|---|---|
| G05B 19/00 | (2006.01) |
| G06K 9/22 | (2006.01) |
| G06K 9/00 | (2006.01) |
| G02F 1/133 | (2006.01) |
| G02F 1/136 | (2006.01) |

(52) U.S. Cl. ...................... 382/124; 382/313; 340/5.53; 340/5.83; 349/33; 349/42

(58) Field of Classification Search .................. 382/124, 382/313; 340/5.53, 5.83; 349/33, 42
See application file for complete search history.

(56) References Cited

U.S. PATENT DOCUMENTS

| | | | |
|---|---|---|---|
| 5,325,442 A | 6/1994 | Knapp | |
| 5,819,103 A | 10/1998 | Endoh et al. | |
| 5,907,627 A | 5/1999 | Borza | |
| 6,083,353 A | 7/2000 | Alexander, Jr. | |
| 6,122,737 A | 9/2000 | Bjorn et al. | |
| 6,125,192 A | 9/2000 | Bjorn et al. | |
| 6,182,892 B1 | 2/2001 | Angelo et al. | |
| 6,229,906 B1 | 5/2001 | Pu et al. | |
| 6,237,461 B1 | 5/2001 | Poole | |
| 6,373,967 B2 | 4/2002 | Pu et al. | |
| 2002/0163601 A1* | 11/2002 | Min et al. | ...................... 349/33 |
| 2002/0180585 A1* | 12/2002 | Kim et al. | .................. 340/5.53 |
| 2006/0017862 A1* | 1/2006 | Song et al. | ..................... 349/42 |

* cited by examiner

*Primary Examiner*—Jingge Wu
*Assistant Examiner*—Kathleen S Yuan
(74) *Attorney, Agent, or Firm*—Ladas & Parry LLP

(57) ABSTRACT

Disclosed is a liquid crystal display device. The device comprises a scan drive unit for selectively outputting turn-on/turn-off signals in the image display mode and outputting turn-on signals in the fingerprint recognition mode; a data drive unit for outputting data signals in the image display mode; a switch control unit for outputting turn-off signals in the image display mode and for selectively outputting turn-on/turn-off signals in the fingerprint recognition mode; a reading unit for outputting fingerprint image information read in the fingerprint recognition mode; a sensor thin film transistor for driving liquid crystal in the image display mode; and a switch thin film transistor having a channel with a first end and a second end, a drain and a source.

6 Claims, 4 Drawing Sheets

LIQUID CRYSTAL DISPLAY DEVICE PERFORMING BOTH IMAGE DISPLAY MODE AND FINGERPRINT RECOGNITION MODE

BACKGROUND OF THE INVENTION

1. Field of the Invention

The present invention relates to a liquid crystal display device, and more particularly to a liquid crystal display device which performs both image display mode and fingerprint recognition mode. The liquid crystal display device according to the present invention is more effective than a piezoelectric sensor or an optical sensor which uses one or more semiconductor components and is generally employed in fingerprint recognition-based security/authentication techniques, in view of reliability and costs. Furthermore, the present invention is directly applicable to STN or TFT-LCD products which themselves have a very wide applicability, so that it can be employed in an electronic commerce system, a security system, a personal recognition/authentication system or the like.

2. Description of the Prior Art

As generally known in the art, password input mode has been principally used for electronic commerce, security, authentication and the like, up to the present. However, since the password input mode is likely to be hacked into, various modes have been developed lately for recognizing biometrical information such as fingerprints.

FIG. 1 is a longitudinal section view of a unit cell in a conventional fingerprint recognition device which employs thin film transistors (TFTs), and FIG. 2 shows a circuit for driving such a fingerprint recognition device. As shown in FIG. 1, a unit cell of the conventional fingerprint recognition device 100 comprises: a sensor TFT 102 for sensing light; a switch TFT 106 for outputting recognized fingerprint information, the sensor TFT and the switch TFT being transversely aligned; a transparent substrate 118; and a backlight 116 for emitting light upward from the underside of the transparent substrate 118, the light passing through an electricity charging unit or a light transmission part 104. A sensor source electrode 112 of the sensor TFT 102 and a switch drain electrode 128 of the switch TFT 106 are electrically connected to each other through a first transparent electrode 124. A second transparent electrode 120 is connected to a sensor gate electrode 114 of the sensor TFT 102. In addition, a photosensitive layer 110 such as amorphous silicon (a-Si:H) is formed between the sensor drain electrode 108 and the sensor source electrode 112, so that the sensor drain electrode 108 and the sensor source electrode 112 become electrically conductive if a predetermined amount of light is incident into the photosensitive layer 110. If a fingerprint is in contact with a coating 126 formed on the top of the unit cell, the light generated from the backlight 116 underneath the transparent substrate 118 is reflected along the pattern of the fingerprint and received by the photosensitive layer 110 of the sensor TFT 102, thereby rendering the TFT 102 to be electrically conductive. A dielectric insulation film 126 functions to isolate the second electrode 124, the sensor gate electrode 114 and the switch gate electrode 136.

Meanwhile, the switch TFT 106 is switched frame by frame, the frames being set to scan a fingerprint by a gate control signal applied to the switch gate electrode 136. Consequently, each sensor TFT 102 scans a fingerprint image inputted into the fingerprint recognition device 100, thereby forming a frame. The fingerprint image scanned in this manner is outputted via the switch source electrode 132. A photosensitive layer 134 is also formed in the switch TFT 106 as in the sensor TFT during the manufacturing process of the fingerprint recognition sensor, but a light shut-off layer 129 is formed on a protective layer 130 so that the switch TFT 106 is not turned on by the light received into the photosensitive layer 134.

Referring to FIG. 2, if a TFT sensor 202, which consists of a light-emitting unit 204, a panel 206 and a coating 208, is turned on by a gate drive unit 210 to scan a fingerprint as described above, fingerprint image information is inputted into a reading unit 212, sent to a control unit 214 and then compared with fingerprint data which has already been inputted into a memory 216. The result of the comparison is sent to a sensor interface 220 of a host computer, so that a process related to security and authentication then proceeds.

FIG. 3 is an equivalent circuit diagram for an array of conventional fingerprint recognition components. As shown in FIG. 3, a unit cell comprises a sensor TFT 302 and a switch TFT 304, and the capacitance existing at the connection between the sensor TFT 302 and the switch TFT 304 is modeled by a capacitor 305. As shown in FIG. 3, lines 306_1 and 306_2 are connected to the gate of the switch TFT 304, and line 308 is connected to the gate of the sensor TFT 302. Line 310 is a data line of the sensor TFT 302 and line 312 functions to outwardly discharge static electricity which may be generated in the light shut-off layer 129 (FIG. 1).

The afore-mentioned fingerprint recognition devices should be separately provided in an electronic commerce system, a security system, a control system and the like. Recently, in connection with the increase of personal portable equipment, mobile phones, personal portable terminals, notebook computers, personal computers and the like, various application techniques have been developed for connecting a fingerprint recognition device with such equipment. However, there is a problem in that the price and volume of a resulting product are increased because it is necessary to buy and mount a separate fingerprint device on a liquid crystal display panel or in a separate space.

SUMMARY OF THE INVENTION

Accordingly, the present invention has been made to solve the above-mentioned problems occurring in the prior art, and an object of the present invention is to provide a liquid crystal display device of novel construction, in which a fingerprint recognition device is integrally formed with the liquid crystal display device, thereby minimizing the increase in the price and size of a resulting product.

In order to accomplish this object, there is provided a liquid crystal display device, which performs both image display mode and fingerprint recognition mode, wherein the liquid crystal display device comprises: a scan drive unit which selectively outputs one or more turn-on/turn-off signals to a corresponding row in the image display mode and which outputs one or more turn-on signals in the fingerprint recognition mode; a data drive unit which outputs one or more data signals in the image display mode; a switch control unit which outputs one or more turn-off signals in the image display mode and which selectively outputs turn-on/turn-off signals to a corresponding row in the fingerprint recognition mode; a reading unit which outputs fingerprint image information read in the fingerprint recognition mode; a sensor thin film transistor which drives liquid crystal in the image display mode, the sensor thin film transistor having a channel with a first end and a second, a drain and a source and, in which the first end of the channel is connected to an output terminal of the data drive unit, a photosensitive layer is formed between the drain and the source of the sensor thin film transistor, and the drain and the source become electrically conductive when light exceeding a predetermined amount of light is incident into the photosensitive layer; and a switch thin film transistor having a channel with a first end and a second, a drain and a source, in which the first end of the channel of the switch thin film transistor is connected to the second end of the channel of the sensor thin film transistor, and the second end of the channel of the switch thin film transistor is connected to the input terminal of the reading unit.

According to this construction of the present invention, it becomes possible to form a photosensitive sensor device, which comprises a sensor thin film transistor, a switch thin film transistor and an electricity charging unit, in each pixel in the inside of an array substrate, itself comprising one or more active components, or a color filter substrate of a liquid crystal display device. As a result, because both image display and fingerprint recognition can be performed by one liquid display device, it is possible to minimize the increase in price and volume of a final product caused by buying and mounting a separate fingerprinting recognition device.

Preferably, the second end of the channel of the sensor thin film transistor and the first end of the channel of the switch thin film transistor are connected to a transparent electrode. The one sensor thin film transistor and the switch thin film transistor are formed on a transparent substrate, and the liquid crystal display device further comprises a light-emitting unit under the transparent substrate. The liquid crystal display device according to the present invention further comprises an electricity charging unit, wherein one end of the charging unit is connected to the second end of the channel of the sensor thin film transistor and the other end of the charging unit is connected to the first end of the channel of the switch thin film transistor, and electric charges generated from the sensor thin film transistor are accumulated in the electricity charging unit.

In addition, the liquid crystal display device further comprises a light shut-off layer formed on the top of the switch thin film transistor.

According to another aspect of the present invention, there is provided a liquid crystal display device, which performs both image display mode and fingerprint recognition mode, wherein the liquid crystal display device comprises: wherein the liquid crystal display device comprises: a scan drive unit which selectively outputs one or more turn-on/turn-off signals to a corresponding row in the image display mode and which outputs one or more turn-on signals in the fingerprint recognition mode; a data drive unit which outputs one or more data signals in the image display mode; a switch control unit which outputs one or more turn-off signals in the image display mode and which selectively outputs turn-on/turn-off signals to a corresponding row in the fingerprint recognition mode; a reading unit which outputs fingerprint image information read in the fingerprint recognition mode; and a flat panel which displays images in the image display mode and receives fingerprint images in the fingerprint recognition mode, wherein a part of the flat panel comprises: a sensor thin film transistor which drives liquid crystal in the image display mode, the sensor thin film transistor having a channel with a first end and a second, a drain and a source and, in which the first end of the channel is connected to an output terminal of the data drive unit, a photosensitive layer is formed between the drain and the source of the sensor thin film transistor, and the drain and the source become electrically conductive when light exceeding a predetermined amount of light is incident into the photosensitive layer; and a switch thin film transistor having a channel with a first end and a second, a drain and a source, in which the first end of the channel of the switch thin film transistor is connected to the second end of the channel of the sensor thin film transistor, and the second end of the channel of the switch thin film transistor is connected to the input terminal of the reading unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
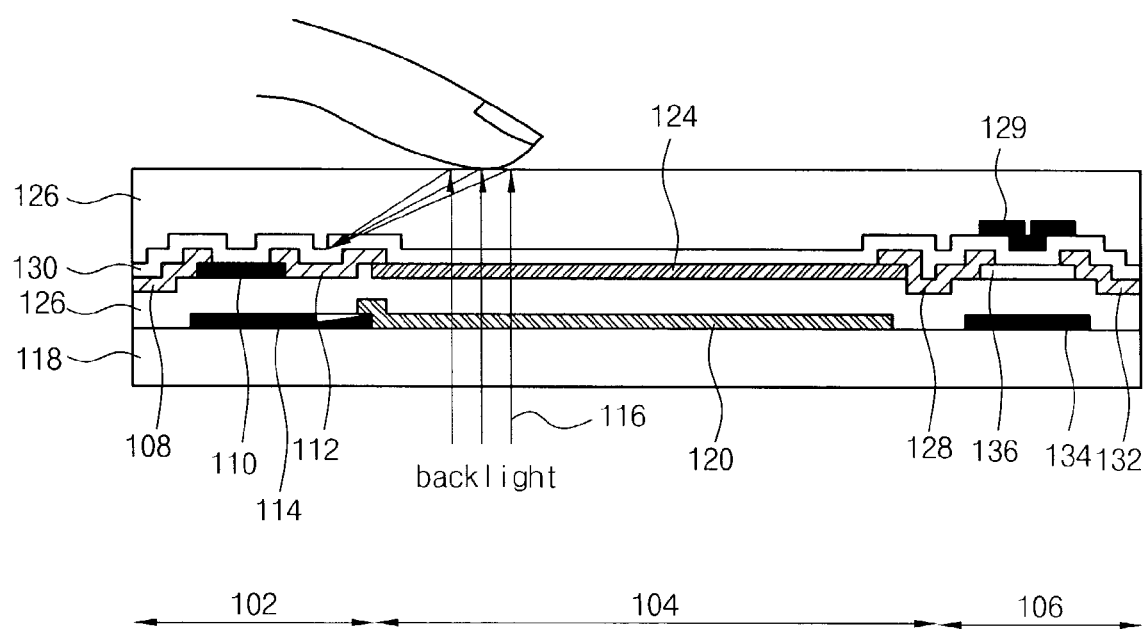
FIG. 1 shows a construction of a unit cell of a conventional fingerprint recognition component.
Figure 2:
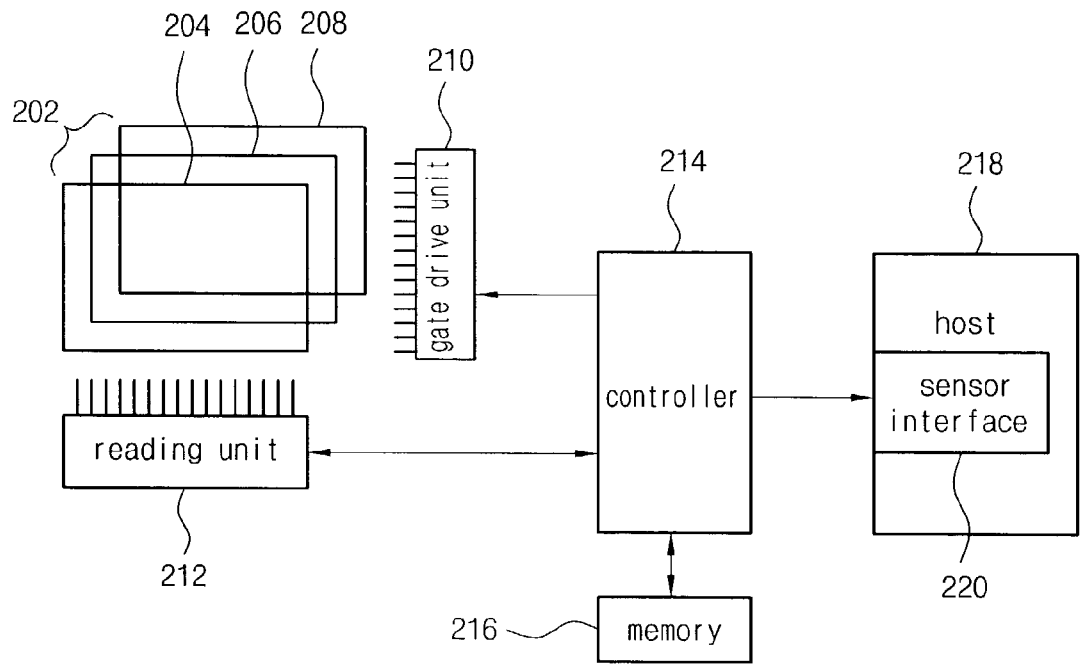
FIG. 2 is a block diagram of a drive unit of the conventional fingerprint recognition component.
Figure 3:
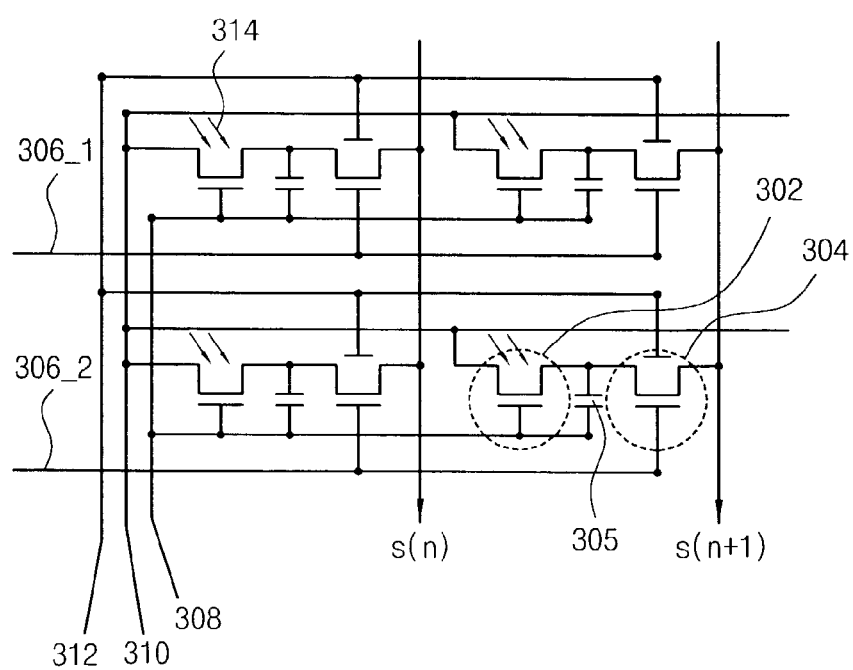
FIG. 3 is a circuit diagram an array of the conventional fingerprint recognition components.

Hereinafter, a preferred embodiment of the present invention will be described with reference to the accompanying drawings. In the following description and drawings, the same reference numerals are used to designate the same or similar components, and so repetition of the description for the same or similar components will be omitted.

Figure 4:
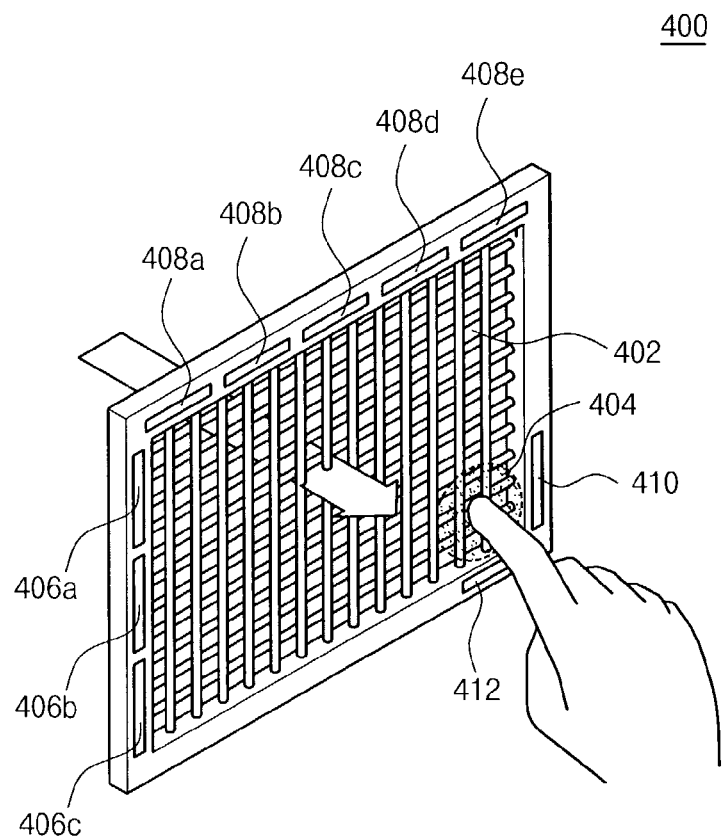
FIG. 4 shows a construction of a liquid crystal display device in accordance with an embodiment of the present invention.

Referring to FIG. 4, a display panel of a liquid crystal display device 400 may comprise an image display region 402 for performing image display only and an image display/finger print recognition region 404 for performing both image display and fingerprint recognition. It is also possible to construct the entire display panel to perform both the image display and the fingerprint recognition. The image display region 402 is same as a conventional TFT-LCD and thus is not specifically described herein. The image display/fingerprint recognition region 404 will be described later in reference to FIG. 5. A scan drive unit, of which the components 406a, 406b, 406c are shown in FIG. 4, selectively outputs turn-on/turn-off signals to a corresponding row in the image display mode, and outputs a turn-off signal in the fingerprint recognition mode. A data drive unit, of which the components 408a, 408b, 408c, 408d, 408e are shown in FIG. 4, output data signals to the image display region 402 and the image display/finger print recognition region 404 of the display panel in the image display mode. In the fingerprint recognition mode, a switch control unit 410 selectively outputs turn-on/turn-off signals to a corresponding row in the image display/fingerprint recognition region 404 in the fingerprint recognition mode. A reading unit 412 outputs image information read from the image display/finger print recognition region 404 in the fingerprint recognition mode.

Figure 5:
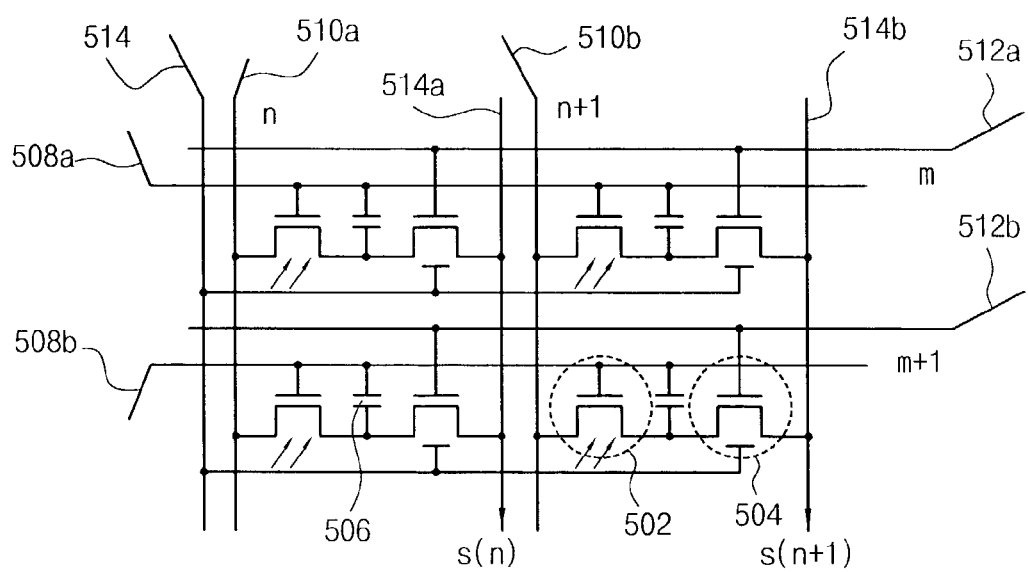
FIG. 5 is a circuit diagram of an array of fingerprint recognition components provided in the liquid crystal display device of FIG. 4.

FIG. 5 is a circuit of an array of fingerprint recognition components which constitute the image display/fingerprint recognition region 404 in the liquid crystal display device shown in FIG. 4. As shown in FIG. 5, a unit cell comprises a sensor TFT 502, a capacitor 506, and a switch TFT 504. The sensor TFT 502 is controlled by the scan drive unit 406 and the data drive unit 408, so that it serves to drive liquid crystal in the image display mode and to generate photocurrent by receiving light reflected from a fingerprint in the fingerprint recognition mode. The capacitor 506 stores the photocurrent generated by the sensor TFT 502 in the form of electric charges. The switch TFT 504 is controlled by the switch control unit 410 and selectively outputs the electric charges stored in the capacitor 506 to the reading unit 412.

As shown in FIG. 5, a gate of the sensor TFT 502 is connected to the scan drive unit 406 (FIG. 4) via lines 508a, 508b. A first end of a channel of the sensor TFT is connected to the data drive unit 408 (FIG. 4) via lines 510a, 510b and the second end of the channel of the sensor TFT is connected to a first end of a channel of the switch TFT 504. The gate of the switch TFT 504 is connected to the switch control unit 410 (FIG. 4) and the second end of the channel of the switch TFT 504 is connected to the reading unit 412 (FIG. 4) via lines 514a, 514b. In FIG. 5, a light shut-off line 514 functions to discharge electric charges so that electric charges are not accumulated in the light shut-off layer (e.g. the light shut-off layer 129 shown in FIG. 1) formed on the switch TFT 504.

The operation of this embodiment now will be described with reference to FIGS. 4 and 5. At first, the scan drive unit 406 (i.e., components 406a, 406b, 406c) applies gate signals to the gates of the TFTs to turn on sensor TFTs of a specific row and to turn off sensor TFTs of another row. The data drive unit 406 (i.e., components 408a, 408b, 408c, 408d, 408e) applies data signals for an image to be displayed to a first end of each channel of the sensor TFTs corresponding to the turned-on row. After data signals are applied to all of the sensor TFTs corresponding to the turned-on row, the sensor TFTs of the next row are turned-on by the scan drive unit 406 and data signals are applied to the sensor TFTs by the data drive unit 408. In this manner, all of the rows are scanned and image data signals are applied to the liquid crystal panel. Herein, the characteristics of gate/data signals inputted to the sensor TFTs are applied in the same manner as in a conventional driving method of liquid crystal display devices without any change. In the image display mode, the switch control unit 410 applies gate signals to turn off all of the switch TFTs 504, so that the data signals applied to the sensor TFTs via the data drive unit 408 are not outputted to the reading unit 412. Instead, these data signals drive the liquid crystal (not shown) of the liquid crystal panel, so that an image corresponding to the applied data signals is displayed.

In the fingerprint recognition mode, the scan drive unit 406 applies gate signals to the gates of all of the sensor TFTs to turn off the sensor TFTs, so that the sensor TFTs cannot receive the data signals from the data drive unit 408. As described with reference to FIG. 1, if the light emitted from the backlight 116 is reflected by a fingerprint and arrives at the photosensitive layer 110, the sensor TFTs generate photocurrents depending on the amount of light that reaches the photosensitive layer 116 and the photocurrents are stored in the capacitor 506 in the form of electric charges. If the switch TFTs of a specific row are turned on by the switch control unit 410, the electric charges stored in the capacitor 506 are outputted to the reading unit 412 through the channels of the corresponding TFTs. Thereafter, the switch TFTs of the next row are turned on by the switch control unit 410 and the electric charges stored in the capacitor 506 are outputted to the reading unit 412 through the corresponding switch TFTs. Through this procedure, it is possible to obtain image information related to the whole fingerprint.

Figure 6:
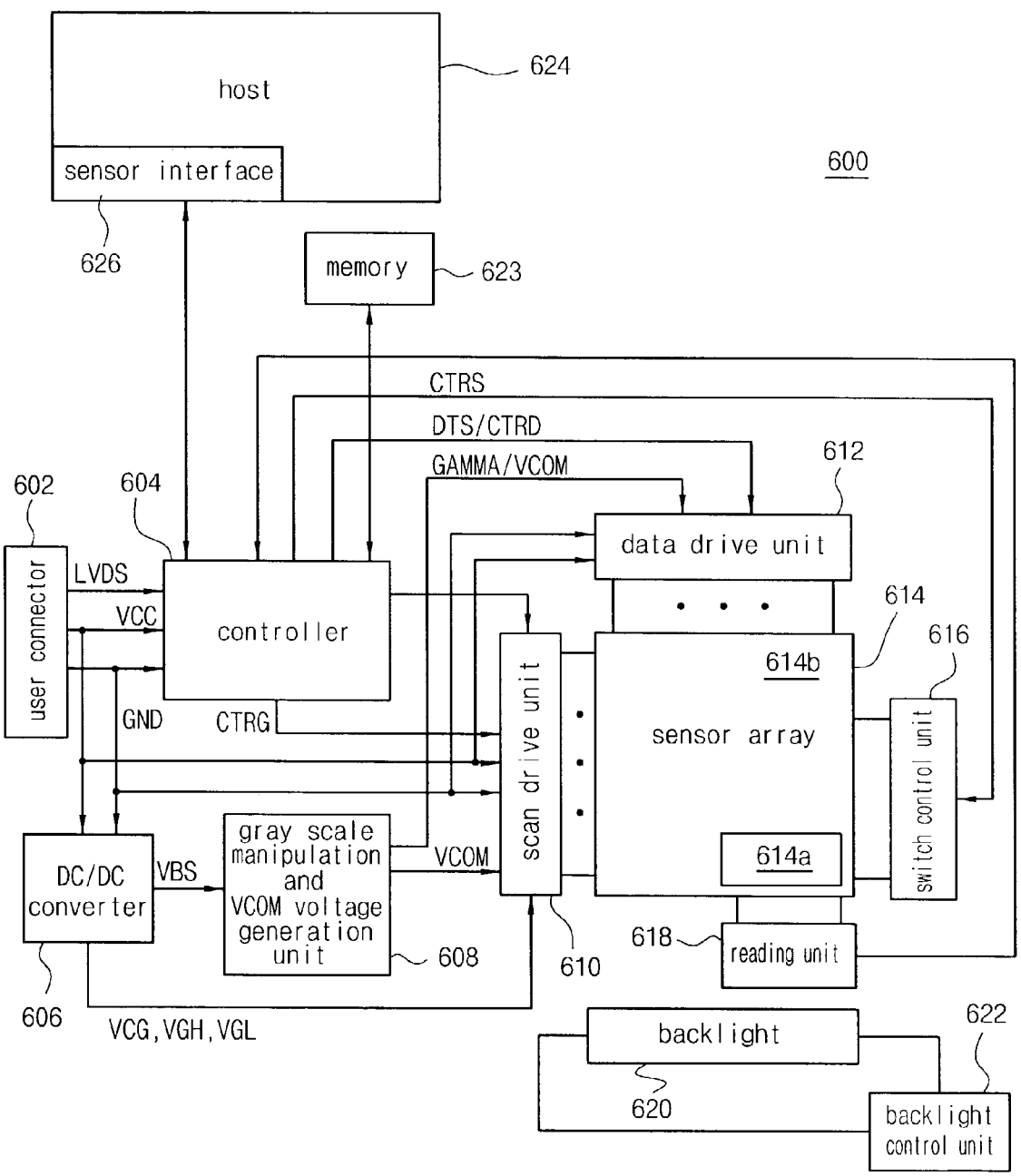
FIG. 6 is a block diagram of a liquid display device and a drive unit in accordance with an embodiment of the present invention.

FIG. 6 is a block diagram of a fingerprint recognition device in accordance with an embodiment of the present invention. As shown in FIG. 6, the whole fingerprint recognition device 600 comprises: a TFT sensor array 614, a part of which is formed with a fingerprint recognition region 614a, a scan drive unit 610, a data drive unit 612, a switch control unit 616, a reading unit 618, a user connector 602, a controller 604, a DC/DC converter 606, a gray scale manipulation and VCOM voltage generation unit 608, a backlight 620, a backlight control unit 622, and a host provided with a sensor interface 626.

If the user connector 602 is connected to a power source, an image signal LVDS and source signals VCC, GND are applied to the fingerprint recognition device 600. Using the signals LVDS, VCC and GND, the controller 604 generates and applies a gate control signal CTRG for controlling a gate of a TFT, which forms the sensor array 614, to the scan drive unit 610, and the controller 604 generates and applies a source data signal DTS and a data drive unit control signal CTRD to the switch control unit 612. The power source signals VCC, GND are also provided to the DC/DC converter 606, the scan drive unit 610, and the data drive unit 612. Using the provided power source signals VDD, GND, the DC/DC converter 606 generates and supplies a power source signal VBS to the gray scale manipulation and VCOM voltage generating unit 608, and the DC/DC converter 606 generates and supplies power source signals VCG, VGH, VGL to the scan drive unit 610. Using the power source signal VBS, the gray scale manipulation and VCOM voltage generating unit 608 generates signals VCOM, GAMMA and supplies the signal VCOM to the scan drive unit 610 and the signals GAMMA, VCOM to the data drive unit 612.

The scan drive unit 610, the data drive unit 612 and the switch control unit 618 are operated as described above. That is, the scan drive unit 610 renders the rows of the TFT sensor array 614 to be sequentially activated in the image display mode, and renders the TFTs of the all of the rows to be turned off in the fingerprint recognition mode. In addition, the data drive unit 612 applies data signals to the channels of the TFTs which form the sensor array 614 in the image display mode. The switch control unit 616 sequentially activates the rows in the fingerprint recognition region 616 in the fingerprint recognition mode, so that fingerprint image signals formed in the fingerprint recognition region 614a are outputted to the reading unit 618 frame by frame. The fingerprint image signals outputted in this manner are supplied to the controller 604, and the controller 604 establishes a person's identity. The person's identity established in this manner is supplied to the host 624 via the sensor interface 626, and the host 624 displays the identity in a form to be distinguishable by the user.

In the case of displaying ordinary screen information, i.e., in the image display mode, the controller 604 supplies one or more gate on/off signals for each frame to the TFT sensors positioned in the image display/fingerprint recognition region 614a, sequentially for each row, like the LCD-TFTs in the image display region 614b, through the data drive unit 612. At this time, the controller 604 supplies one or more gate off signals to the switch TFTs positioned in the image display/fingerprint recognition region 614a, so that the sensor TFTs prevent the inputted data signals from being sent out to the reading unit 618.

When the fingerprint recognition is performed, the controller 604 supplies gate off signals to all of the sensor TFTs in the image display/fingerprint recognition region 614a through the scan drive unit 610. Therefore, no data signal is inputted from the data drive unit 612. Instead, the photosensitive layer on the sensor TFTs is operated by the reflected light and generates photocurrents depending on the amount of light received in the photosensitive layer. The photocurrents having been generated in such a way are then stored in the capacitors between the sensor TFTs and the switch TFTs in the form of electric charges. The controller 604 supplies one or more gate on/off signals for each frame to the sensor TFTs positioned in the image display/fingerprint recognition region 614a, sequentially for each row, through the switch control unit 616, so that the electric charges stored in the capacitor are outputted to the reading unit 618. As a result, the entire display screen turns to black or white in accordance with the liquid crystal driving modes or displays a color in compliance with the color of the fingerprint recognition screen. While the fingerprint recognition mode is being operated, ordinary image information is not displayed. That is, the liquid crystal display device in accordance with the present invention includes two display screens, one for the image display mode and the other for the fingerprint recognition mode, and the controller supplies control signals corresponding to the image display mode and the fingerprint recognition mode so that the screens are respectively converted into displaying modes as needed.

The finger print recognition device 600 as shown in FIG. 6 can be formed concurrently with manufacturing active components in the liquid crystal display device.

According to the present invention as described above, it becomes possible to form a photosensitive sensor component, which comprises a sensor thin film transistor, a switch thin film transistor and an electricity charging unit, within each pixel in the inside of an array substrate, which comprises active components, or a color filter substrate of a liquid crystal display device. Therefore, both image display and fingerprint recognition can be performed by one liquid display device, and thus it is possible to minimize the increase in price and volume of a final product caused by buying and mounting a separate fingerprinting recognition device.

The effects achieved by the present invention are summarized as follows:

i) Because a photosensitive sensor of a thin film transistor type, which reads and converts optical type image information into an electric signal, may be formed concurrently with producing a TFT array substrate in a liquid crystal panel to be included in the TFT array substrate, it is possible to construct a fingerprint recognition system in a mobile phone, a notebook computer, a personal portable terminal, a monitor, a television or the like;

ii) Because a photosensitive sensor and a TFT array substrate which have been produced in different production lines and by separate manufacturing processes may be concurrently produced in the same production line and by the same manufacturing process, it is possible to reduce the manufacturing time and costs;

iii) Because it is possible to reduce the occurrence of additional costs in designing and providing a fingerprint recognition device in the associated products, it is advantageous in view of the price of product; and iv) The present invention is widely applicable, so that its utility value can be enhanced in the sphere of everyday life (e.g., an approval system for electronic commerce using an Internet) as well as in the security field. Furthermore, because it becomes easy to manufacture associated products, demand for a TFT-LCD can be increased.

The above embodiments have been specifically described in connection with fingerprint recognition. However, the present invention can be embodied as an image sensor for other purposes. The preferred embodiment of the present invention has been described for illustrative purposes, and those skilled in the art will appreciate that various modifications, additions and substitutions are possible, without departing from the scope and spirit of the invention as disclosed in the accompanying claims.

What is claimed is:

1. A liquid crystal display panel having an image display region on which images are displayed and having a fingerprint recognition region within said image display region, said fingerprint recognition region being capable of both actively displaying images and generating signals that represent fingerprints on finger tips that are placed on said fingerprint recognition region, said liquid crystal display panel having a plurality of thin film transistors (TFTs) in the image display region that drive display pixels arranged in rows and further having a plurality of TFTs in the fingerprint recognition region said plurality of TFTs in the fingerprint recognition region being a subset of the plurality of TFTs in the image display region, and, which drive display pixels arranged in rows and which detect light reflected from finger tips wherein the liquid crystal display panel comprises:

a scan drive unit which selectively outputs turn-on signals to sensor TFTs of a specific row and turn-off signals to sensor TFTs of other rows in an image display mode and which outputs turn-off signals to sensor TFTs in the fingerprint recognition region in a fingerprint recognition mode;

a data drive unit which outputs one or more data signals in the image display mode;

a switch control unit which outputs turn-off signals to switch TFTs in the image display mode and which selectively outputs turn-on signals to switch TFTS in of a specific row and turn-off signals to switch TFTs of other rows in the fingerprint recognition region in the fingerprint recognition mode;

a reading unit which outputs fingerprint image information read in the fingerprint recognition mode;

a plurality of sensor thin film transistors (TFTs) in the fingerprint recognition region which drive liquid crystal in the image display mode, sensor thin film transistors having a channel with a first end and a second end, a drain and a source and, in which the first end of the channel is connected to an output terminal of the data drive unit, a photosensitive layer is formed between the drain and the source of the sensor thin film transistor, and the drain and the source become electrically conductive when light exceeding a predetermined amount of light is incident into the photosensitive layer; and a plurality of switch thin film transistors (TFTs) in the fingerprint recognition region, switch film transistors having a channel with a first end and a second end, a drain and a source, in which the first end of the channel of the switch thin film transistor is connected to the second end of the channel of the sensor thin film transistor, and the second end of the channel of the switch thin film transistor is connected to an input terminal of the reading unit;

wherein the image display region and said fingerprint recognition region are substantially co-planar.

2. The liquid crystal display panel according to claim 1, wherein switch thin film transistors are switched on for each frame in order to scan a fingerprint image.

3. The liquid crystal display panel according to claim 1, wherein the second end of the channel of a sensor thin film transistor and the first end of the channel of a switch thin film transistor are connected to a transparent electrode.

4. The liquid crystal display panel according to claim 1, wherein a sensor thin film transistor and a switch thin film transistor are formed on a transparent substrate, and the liquid crystal display panel further comprises a light-emitting unit under the transparent substrate.

5. The liquid crystal display panel according to claim 1, wherein the liquid crystal display panel further comprises an electricity charging unit, one end of the charging unit being connected to the second end of the channel of a sensor thin film transistor and to the first end of the channel of a switch thin film transistor the other end of the charging unit being connected to the scan drive unit, and wherein electric charges generated from the sensor thin film transistors are accumulated in the electricity charging unit.

6. The liquid crystal display panel according to claim 1, further comprising a light shut-off layer formed on the top of the switch thin film transistor.

* * * * *